United States Patent [19]

Dupre

[11] 4,146,589

[45] Mar. 27, 1979

[54] METHOD FOR PREPARING A MONOALKENYL AROMATIC POLYBLEND HAVING A DISPERSED RUBBER PHASE AS PARTICLES WITH A BIMODAL PARTICLE SIZE DISTRIBUTION

[75] Inventor: Carl R. Dupre, Amherst, Mass.

[73] Assignee: Monsanto Company, St. Louis, Mo.

[21] Appl. No.: 907,632

[22] Filed: May 19, 1978

[51] Int. Cl.² .............................................. C08L 51/04
[52] U.S. Cl. ............................ 260/876 R; 260/880 R
[58] Field of Search ........................... 260/876 R, 880

[56] References Cited

U.S. PATENT DOCUMENTS

| | | | |
|---|---|---|---|
| 3,488,744 | 1/1970 | Nemphos et al. | 260/880 |
| 3,652,721 | 3/1972 | Dalton et al. | 260/876 R |
| 3,903,200 | 9/1975 | Cincera et al. | 260/876 R |
| 3,903,202 | 9/1975 | Carter et al. | 260/880 |

*Primary Examiner*—Carman J. Seccuro
*Attorney, Agent, or Firm*—Joseph S. Nelson; William J. Farrington; James C. Logomasini

[57] ABSTRACT

This invention relates to a method for preparing improved monoalkenyl aromatic polyblends having a dispersed rubber phase as rubber particles having a bimodal particle size distribution and compositions thereof.

21 Claims, No Drawings

METHOD FOR PREPARING A MONOALKENYL AROMATIC POLYBLEND HAVING A DISPERSED RUBBER PHASE AS PARTICLES WITH A BIMODAL PARTICLE SIZE DISTRIBUTION

BACKGROUND OF THE INVENTION

High impact polystyrene polyblends (HIPS) comprising polystyrene having a rubber phase dispersed therein, as crosslinked rubber particles, are known. Historically, mechanical blends were prepared by melt blending polystyrene with raw rubber which was incompatible and dispersed as crosslinked rubber particles to reinforce and toughen the polymeric polyblend. More recently, HIPS polyblends have been prepared by mass polymerizing solutions of diene rubber dissolved in styrene monomer in batch reactors wherein the rubber molecules were grafted with styrene monomer forming polystyrene polymer grafts on the rubber along with polystyrene polymer in situ in the monomer. As the polystyrene-monomer phase increases during polymerization the grafted rubber phase inverts readily as rubber particles comprising grafted rubber and occluded polystyrene contained therein with said particles crosslinked to maintain the rubber particles as discrete particles dispersed in the polystyrene which forms a matrix phase of the HIPS polyblend.

Such HIPS polyblends conventionally contained rubber particles having an average particle size or diameter of about 0.5 to 1.0 microns to provide toughness yet small enough to insure good gloss for molding or sheet applications.

As such HIPS polyblends have moved in engineering applications even greater toughness is needed consistent with good gloss. Efforts to increase the toughness by adding more rubber have met with limited success in that the polymerization processes can only accommodate concentrations up to 15 to 20% and high levels of rubber increase cost and lower gloss. Efforts to increase the particle size of the rubber beyond about 1.0 microns to increase toughness as disclosed in U.S. Pat. No. 4,012,462 has met with limited success because of loss of gloss and flow properties.

It has been discovered that small amounts of larger sized rubber particles can be added to HIPS polyblends without loss of gloss or flow properties providing unexpectedly great increases in toughness beyond the proportionately small amounts of larger particles added to conventional HIPS polyblend having a rubber particle size averaging 0.5 to 1.0 microns.

It is hereby disclosed that the toughness of HIPS polyblends can be increased as much as 50% or more by the novel process of the present invention wherein HIPS polyblends are prepared having a bimodal rubber particle size distribution i.e., 70 to 95% of the rubber particles have an average particle size of about 0.5 to 1.0 microns and 5 to 30% of the rubber particles have an average rubber particle size of 2 to 3 microns.

SUMMARY OF THE INVENTION

The present invention relates to a method for preparing monoalkenyl aromatic polyblends having a dispersed rubber phase as a rubber particle wherein said rubber particles have a bimodal size distribution comprising, A. continuously mass polymerizing a first solution of a monoalkenyl aromatic monomer having dissolved therein about 2 to 15% by weight of a diene rubber in a first reaction zone to a conversion of 10 to 50% forming a partially polymerized first solution with said rubber phase dispersed as rubber particles having an average diameter of about 0.5 to 1.0 microns, B. continuously mass polymerizing a second solution of a monoalkenyl aromatic monomer having dissolved therein about 2 to 15% by weight of a diene rubber in a second reaction zone to a conversion of about 10 to 50% forming a partially polymerized second solution with said rubber phase dispersed as rubber particles having an average diameter of about 2 to 3 microns, C. continuously mixing said first and second partially polymerized solutions to form a third partially polymerized solution having said rubber phase dispersed as rubber particles having a bimodal particle size distribution wherein about 70 to 95% of said particles have a particle size diameter of about 0.5 to 1.0 microns and 5 to 30% of said particles have a particle size diameter of about 2.0 to 3.0 microns, D. continuously mass polymerizing said third partially polymerized solution to a conversion of 50 to 90% in a third reaction zone, E. continuously heating an effluent from said third reaction zone to a temperature such that said rubber phase moiety becomes crosslinked as crosslinked rubber particles and, F. continuously separating a polyblend from said heated effluent, said polyblend having a polyalkenyl aromatic polymer as a metrix phase with a dispersed rubber phase as rubber particles with said bimodal rubber particle size distribution said polyblend having improved toughness and gloss.

DESCRIPTION OF THE PREFERRED EMBODIMENTS

THE POLYMER

The polymer is a polymonoalkenyl aromatic polymer comprised of at least one monoalkenyl aromatic monomer of the formula:

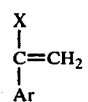

where Ar is selected from the group consisting of phenyl, halo-phenyl, alkylphenyl and alkylhalophenyl and mixtures thereof and X is selected from the group consisting of hydrogen and an alkyl radical of less than three carbon atoms.

Exemplary of the monomers that can be employed in the polymer are styrene; alpha-alkyl monovinylidene monoaromatic compounds, e.g., alpha-methylstyrene, alhpa-ethylstyrene, alpha-methylvinyltoluene, etc.; ring-substituted alkyl styrenes, e.g., vinyl toluene, o-ethylstyrene, p-ethylstyrene, 2,4-dimethylstyrene, etc.; ring-substituted halostyrenes, e.g., o-chlorostyrene, p-chlorostyrene, o-bromostyrene, 2,4-dichlorostyrene, etc.; ring-alkyl, ring-halo-substituted styrenes, e.g., 2-chloro-4-methylstyrene, 2,6-dichloro-4-methylstyrene, etc. If so desired, mixtures of such monovinylidene aromatic monomers may be employed.

THE RUBBER SUBSTRATE

Exemplary of the various rubbers onto which the monomers can be grafted during polymerization in the present thereof to produce the grafted rubbers are diene rubbers, natural rubbers, polyisoprene rubbers and mixtures thereof, as well as interpolymers thereof with each other or other copolymerizable monomers.

The preferred substrates, however, are diene rubbers (including mixtures of diene rubbers), i.e., any rubbery polymer (a rubbery polymer having a second order transition temperature not higher than 0° centigrade, preferably not higher than −20° centigrade, as determined by ASTM Test D-746-52T) of one or more of the conjugated, 1.3 dienes, e.g. butadiene, isoprene, 2-chloro-1,3-butadiene, 1 chloro-1,3-butadiene, cyclopentenomer. Such rubbers include copolymers and block copolymers of conjugated 1,3-dienes with up to an equal amount by weight of one or more copolymerizable monoethylenically unsaturated monomers, such as monovinylidene aromatic hydrocarbons (e.g. styrene; an aralkylstyrene, such as the o-, m- and p-methylstyrenes, 2,4-dimethylstyrene, the arethylstyrenes, p-tert-butylstyrene, etc.; an alphamethylstyrene, alpha-ethylstyrene, alpha-methyl-p-methyl styrene, etc.; vinyl naphthalene, etc.); arhalo monovinylidene aromatic hydrocarbons (e.g. the o-, m- and p-chlorostyrene, 2,4-dibromostyrene, 2-methyl-4-chlorostyrene, etc.); acrylonitrile; methacrylonitrile; alkyl acrylates (e.g. methyl acrylate, butyl acrylate, 2-ethylhexyl acrylate, etc.), the corresponding alkylmethacrylates; archlamides (e.g. acrylamide, methacrylamide, N-butylacrylamide, etc.); unsaturated ketones (e.g. vinyl methyl ketone, methyl isopropenyl ketone, etc.); alpha-olefins (e.g. ethylene, propylene, etc.); pyridines; vinyl esters (e.g. vinyl acetate, vinyl stearate, etc); vinyl and vinylidene halides (e.g. the vinyl and vinylidene chlorides and bromides, etc.); and the like.

Although the rubber may contain up to about 2.0% of a crosslinking agent, based on the weight of the rubber-forming monomer or monomers, crosslinking may present problems in dissolving the rubber in the monomers for the graft polymerization reaction. In addition, excessive crosslinking can result in loss of the rubber characteristics.

A preferred group of rubbers are the stereospecific polybutadiene rubbers formed by the polymerization of 1,3-butadiene. These rubbers have a cis-isomer content of about 30–99.5% and a trans-isomer content of about 70–2% and generally contain at least about 85% of polybutadiene formed by 1,4 addition with no more than about 15% by 1,2 addition. Mooney viscosities of the rubber (ML-4, 212° F.) can range from about 20 to 70 with a second order transition temperature of from about −50° to −105° C., as determined by ASTM Test D-746-52T.

PROCESS FOR PREPARATION OF HIPS POLYBLEND

One such continuous process for preparing the individual polyblends of the present composition is disclosed in U.S. Pat. No. 3,903,202 and is incorporated by reference.

A monomer composition comprising at least one monoalkenyl aromatic monomer having about 2–15% by weight of a diene rubber dissolved therein is charged continuously as a monomer-rubber solution to the initial reaction zone. The monomer is polymerized at temperatures of about 110° –140° C., in the first zone converting about 10–50% by weight of the monomer to a alkenyl aromatic polymer. At least a portion of the monomer polymerized is grafted as polymer molecules to the diene rubber as a superstrate.

The remainder of the polymer formed is dissolved in said monomer composition as polymerized forming a monomer-polymer solution. The monomer-polymer solution or phase is incompatible with the monomer-rubber solution or phase and phase separation is observed by the well known Dobry effect. As the polymer concentration of the monomer polymer-phase increases and has a volume slightly larger than the monomer-rubber phase, the monomer-rubber phase disperses as rubber-monomer particles aided by the shearing agitation of the stirred first reaction zone.

The agitation must be significant and of high enough shear to disperse and size the rubber particles uniformly throughout the monomer-polymer phase. The intensity of the stirring will vary with the size and geometry of the initial reactor, however, simple experimentation with a given stirred reactor will establish the sufficient amount of stirring needed to insure the homogeneous dispersion of the rubber particles throughout the monomer-polymer phase. The particle size of the rubber can be varied from a weight average particle diameter of from about 0.5 to 5 microns preferably from 0.5 to 3 microns to provide a balance between the impact strength and the gloss of the rubber reinforced polyblend. Higher stirring rates and shearing agitation can lower the size of the dispersed rubber particle, hence, must be controlled to provide sufficient stirring to size the particles to the predetermined size needed and insure homogeneous dispersion.

At steady state polymerization, in the initial polymerization zone, the continuously charged monomer composition containing 2 to 15% by weight diene rubber disperses almost instantaneously, under stirring, forming the rubber-monomer particles which on complete polymerization form discrete rubber particles. The conversion of monomers to polymers in the first reaction zone is controlled between 1–50% and must have a weight percent level that provides a polymer content in excess of the rubber content of the monomer composition to insure the dispersion of the monomer-rubber phase to a rubber-monomer particle phase having a predetermned size and being dispersed uniformly throughout the monomer-polymer phase.

The rubber particle becomes grafted with polymer in the first reaction zone which aids its dispersion and stabilizes the morphology of the particle. During the dispersion of the rubber-monomer particles, some monomer-polymer phase is occluded within the particle. The total amount of occluded monomer-polymer phase and grafted polymer present in the particles can be from 0.5 to 5 grams for each gram said diene rubber.

The dispersed rubber phase increases the toughness of the polymeric polyblend as measured by its Izod impact strength by Test ASTM D-256-56. It has been found that the impact strength of polyblends increase with the weight percent rubber dispersed in the polyblend in the range of 2 to 15% as used in the present invention. The impact strength is also determined by the size of the dispersed rubber particles, with the larger particles providing higher impact strength within in the range of 0.5 to 3 microns measured with a photosedimentometer by the published procedure of Graves, M. J. et.al., "Size Analysis of Subsieve Powders Using a Centrifugal Photosedimentomer", British Chemical Engineering 9:742–744 (1964). A Model 3000 Particle Size Analyzer from Technidyne Corporation, 1866 Production Dr. Louisville, Ky. was used.

The weight average diameter of the rubber particles also effects gloss with smaller particles giving high gloss and the larger particles giving low gloss to the fabricated polyblend article such as a molding or sheet product. One must balance impact strength and gloss requirements in selecting an optimum rubber particle size.

It has been found that a good balance between gloss and toughness can be provided in the polyblend if 70 to 95% of the rubber particles have a particle size of 0.5 to 1.0 microns for gloss and toughness and only 5 to 30% of the rubber particles have a particle size of 2.0 to 3.0 microns to provide improved toughness giving the polyblend a bimodal rubber particle size distribution insuring good gloss and toughness.

Processwise, in the initial reactor, one must (1) form and disperse the rubber particle, and (2) graft and stabilize the rubber particle maintaining its size and morphology or structure. The amount of occluded monomer-polymer phase described above is held at a predetermined level described above by steady state polymerization wherein the monomer is converted to polymer, at least a portion of which, grafts to the rubber stabilizing the rubber particle. It has been found that the higher the amount of occlusion stabilized within the rubber particle the more efficiently the rubber phase is used in toughening the polyblend. The rubber particle acts much as a pure rubber particle if the occlusions are controlled at the amount described above during their stabilization in the initial reaction zone and throughout the total polymerization process. The rubber particle is also grafted externally stabilizing its structure as to size and its dispersibility in the monomer-polymer phase.

The initial reactor forms a first mixture of a monomer-polymer phase having the rubber phase described dispersed therein. The first mixture is charged to a staged isobaric stirred reaction zone as a second zone. The first mixture is polymerized by progressive multistage substantial linear flow polymerizations with the conversion of polymer advancing from about 1-50% conversion in the first stage to 50 to 90% conversion in the final stage of the staged isobaric stirred reaction zone as a second zone. This provides a gradual progressive increase of polymer in the monomer-polymer phase. This has been found to be important in maintaining the morphology or structure of the dispersed rubber-monomer particles.

It has been found that in the initial reaction zone as the rubber particle is formed, that the rubber-monomer particle has a monomer content that corresponds to the monomer content of the monomer-polymer phase. The rubber-monomer particle will stabilize at this level as the monomer polymerizes inside the rubber particle and grafted polymer is formed on the rubber. Hence, it has been found that the lower the level of conversion or polymer in the monomer-polymer phase of the initial reactor the higher the amount of monomer found in the rubber-monomer particles formed as the rubber solution is charged and dispersed in the monomer-polymer phase. Conversely, if the conversion is high in the initial stage less monomer is occluded in the rubber phase particle on dispersion. As described earlier, the first mixture is polymerized in the staged linear flow second zone and the percent by weight of polymer being formed is progressively higher with each stage having a slightly higher polymer content. The staged linear progressive polymerization of the monomer giving desirable polymers but was found unexpectedly to preserve the integrity of the rubber particles. Although not completely understood, as the rubber particle becomes grafted and the monomer-polymer phase forms in the occluded monomer of the rubber particle, the monomer is not readily extracted from the rubber particle by the monomer-polymer phase as the polymer content increases gradually in the monomer-polymer phase during polymerizing in the staged reactor. It is thought that since the polymerization in the multistaged linear reaction zone is so gradual that polymer is being formed in both the rubber particle and the monomer-polymer phase at about the same rate, hence, the total polymer content of the occluded monomer-polymer phase of the rubber particle is about the same as polymer content of the monomer-polymer phase and monomer is not extracted, hence, the weight percent of occlusion is stabilized and remains substantially constant after formation in the initial reactor.

It has been found possible to analyze the amount of total occluded polymer phase and grafted polymers. The final polymerized polyblend product (1 gram) are dispersed in a 50/50 acetone/methyl ethyl ketone solvent (10 ml.) which dissolves the polymer phase matrix leaving the rubber phase dispersed. The rubber phase is separated from the dispersion by centrifuge as a gel and dried in a vacuum oven at 50° C., for 12 hours and weighed as a dry gel.

$$\frac{\% \text{ Dry gel}}{\text{in Polyblend}} = \frac{\text{Weight of dry gel}}{\text{Weight of polyblend}} \times 100$$

$$\left.\begin{array}{l}\% \text{ Graft and} \\ \text{Occlusions} \\ \text{in Rubber}\end{array}\right\} = \frac{\% \text{ dry gel} - \% \text{ rubber}}{\text{Percent rubber*}} \times 100$$

$$\left.\begin{array}{l}\text{Parts** by weight} \\ \text{of graft polymer} \\ \text{and occluded poly-} \\ \text{mer per unit weight} \\ \text{of rubber}\end{array}\right\} = \frac{\% \text{ dry gel} - \% \text{ rubber}}{\text{Percent Rubber}}$$

*Percent rubber determined by infra-red spectrochemical analysis of the dry gel
**The present invention preferably has present about 0.5 to 5 grams of occluded and grafted polymer per gram of diene rubber particle.

The swelling index of the rubber graft particles is determined by taking the dry gel above and dispersing it in toluene for 12 hours. The gel is separated by centrifuge and the supernatant toluene drained free. The wet gel is weighed and then dried in a vacuum oven for 12 hours at 50° C., and weighed.

$$\text{Swelling Index} = \frac{\text{weight of wet gel}}{\text{weight of dry gel}}$$

As described earlier the amount of occlusions and graft polymer present in the rubber particle is present in the amount of about 0.5 to 5 part for each part of diene rubber. The percent dry gel measured above then is the percent gel in the polymerized polyblend and represents the dispersed rubber phase having polymeric occlusions and polymeric graft. The percent gel varies with the percent rubber charged in the monomer composition and the total amount of graft and occluded polymer present in the rubber phase.

The swelling index of the rubber as determined above is important to the final properties of the polyblend. A low swelling index indicates that the rubber has been crosslinked by the monomer as it polymerizes to a polymer phase in the rubber-monomer particle. Generally, the conversion of monomer to polymer in the occlusion follows the rate of conversion of monomer to polymer in the monomer-polymer phase. In devolatilization, the temperatures of the second mixture is raised to about 200° to 250° C., for sufficient time to crosslink the rubber particles such that they have a swelling index of from about 7 to 20 preferably from about 8 to 16.

Preferably, the combined polymer of the matrix phase of the polyblends produced by this invention has a dispersion index (Mw/Mn), wherein Mw is a weight average molecular weight and Mn is a number average molecular weight, ranging from about 2.0 to 4.0 preferably 2.2 to 3.5. The dispersion index is well known to those skilled in the art and represents the molecular weight distribution with the lower values having narrow molecular weight distribution and higher values having broader molecular weight distribution. The average molecular weight of the combined polymer of the matrix phase preferably range from 40,000 to 70,000 Staudinger.

SECOND REACTION ZONE POLYMERIZATION

The second reaction zone polymerization is carried out in a staged isobaric stirred reaction zone maintaining conditions so as to polymerize said first mixture by progressive multistage substantially linear flow polymerization all said stages operating with shearing agitation and common evaporation vapor phase cooling under isobaric conditions in said second reaction zone, providing each said stage with steady state polymerization at controlled temperature and interfacial liquid contact stage to stage establishing a hydraulic pressure gradient from the first stage downstream to the final stage causing substantially linear flow through said second zone, all said stages operating at predetermined conversion levels producing a composite polymer as a second polymer in said second reaction zone having a predetermined molecular weight distribution and average molecular weight maintaining the structural integrity of said dispersed rubber particle, said second zone producing a second mixture having a total polymer content being determined by said multistage steady state polymerization and evaporation of said monomers.

The reactor operates under controlled isobaric conditions. For the range of temperatures normally of interest for alkenyl aromatic monomers, e.g. styrene polymerization (130° –180° C.), the operating pressure will range from 7 to 28 psia. The styrene reaction is exothermic and cooling is provided primarily by vaporization of a part of the monomer from the reacting mass. Further cooling can be provided by a jacket. Cooling by the condensed recycle monomer feeding into either the first or second reaction zone is also provided. The mass is in a boiling condition and temperature is determined by the natural relationship between vapor pressure and boiling point. This relationship is also a function of the relative amounts of polymer, monomer, and other substances (e.g. dissolved rubber, solvents, and additives). Since, as material progresses through this reactor, the amount of polymer continuously increases and the amount of monomer corresponding decreases via polymerization, and monomer content further decreases due to vaporization loss, the temperature progressively increases from inlet to outlet stages.

To accommodate the natural swell of the boiling mass, and to provide space for vapor disengagement, the reactor is usually run at a fillage of about 10 to 90% preferably 40 to 60% of its volume.

Vapor passes out of the reactor to an external condenser where it is condensed and may also be subcooled. This condensate may then be handled in several ways, for example.

1. If the reactor used this invention is preceded by another reactor in a multi-reactor train, the condensate may be returned to a preceding reactor.

2. The condensate may be returned to the inlet compartment of the reactor used this invention, wherein it is reheated by condensation of a fraction of the previously evolved vapors and mixes other incoming free materials.

In a multi-compartment staged reactor, each stage is well mixed, and the reaction mass is substantially homogeneous within itself. The discs which separate the stages discourage backflow of material between compartments. The clearance between disc and shell does permit some backflow, and also permits the necessary forwarding of material through the compartments from reactor inlet to outlet giving substantially linear flow.

In a compartmented staged reactor as here described, the first stage has a relatively low conversion level, since it is being continuously fed by monomer and low conversion prepolymerized syrup. However, the rate of conversion in this stage is relatively high because of the high concentration of monomer.

In each succeeding stage, the conversion level is higher than the preceding one, which tends to lower the rate of conversion. Offsetting this effect, however, are the facts that the temperature is higher and that monomer is being vaporized out of the mass. Thus, the total conversion to polymer obtained per unit fillage volume of the staged reactor is higher than that which could be obtained in a single stage reactor producing an equal final conversion level at equal temperature.

Clearance between rotating disc compartment baffles and cylindrical wall may be from 1 to 10% of shell radius, the larger values being appropriate to the high conversion end of the reactor where viscosity is at maximum. Stage to stage forward flow of the polymerizing first mixture is through this clearance, and vapor from the polymerizing first mixture also counterflow through the clearance, above the surface level of the mass.

The second polymerized mixture formed in the second reaction zone is removed continuously from said second reaction zone as a melt by a suitable means such as a gear pump and jumped to a heating and devolatilizing zone as disclosed in U.S. Pat. No. 3,903,202. The second mixture is heated to a temperature of 180° to 250° C. in a heat exchanger have tubes that exit into a devolatilization chamber operating at pressures below atmospheric, e.g. about 25 to 75 tors. The unpolymerized monomers are devolatilized and stripped from the polyblended continuously which is in melt form. The melt was pumped through a die continuously and diced into pellets as a polyblend product of a polyalkenylaromtic polymer having a bimodal particle size distribution.

The shearing agitation sufficient to size and disperse the rubber phase as rubber particles is conveniently carried out by anchor agitators or helical ribbon agitators having a close clearance with the walls of the stirred tank to induce shearing at the walls of the polymerizing mixture. Such agitators will uniformly mix high viscosity syrups such as those in the first reaction zone.

Those skilled in the art realize that each stirred tank has its own geometry which precludes specifying any basic mixing parameters that will apply to all systems. Hence, simple mixing experiments with any given stirred tank can be made to determine the rubber particle size that will be produced for any given system. For a 100 gallon cylindrical stirred tank having a inside diameter of about 33 inches and an anchor agitator of about 31 inches, it was found that rubber particles having a particle size of 0.5 to 1.0 micron required a tip speed of about 675 to 1500 ft./min. to size the particles in this size range, i.e., about 1500 ft./min. for 0.5 micron size and about 675 ft./min. for particles of about 1.0 micron. Tip speeds of about 200 to 300 ft./min. were required to size particles in the 3.0 to 2.0 micron range.

A preferred mode of operation is to have a large first reactor preparing said first partially polymerized solution in step (A) having a rubber particle size of 0.5 to 1.0 micron such that the reactor can continuously supply 70 to 95% by weight of the feed stream to step (C). A smaller second reactor can be used to form said second partially polymerized solution having a rubber particle size of about 2.0 to 3.0 microns such that the reactor can continuously supply 5 to 30% by weight of the feed stream to step (C).

The feed streams are mixed continuously in step (C) by any convenient mixing method having shearing agitation equal to or less than that used in the second reactor to insure that the rubber particle size will be maintained as a bimodal particle size distribution, i.e., the larger particles will not be sheared to a smaller size.

The mixing can be carried out continuously by any conventional low shear mixing means, e.g., in a stirred flow through tank or with in line pipe mixing means well known to those skilled in the art. The third partially polymerized solution from step (C) is then fed to a third reaction zone and continuously polymerized in step (D) to about 50 to 90% conversion. The third reaction zone can be a tubular reactor, a tower reactor, an evaporatively cooled boiling reactor or by mass polymerization carried out in aqueous suspension.

The preferred method of polymerizing in step (C) is that carried out in an staged, isobaric stirred reactor as disclosed in U.S. Pat. No. 3,902,202 as described hereinbefore.

The following examples are set forth to be illustrative of the invention herein described and not intended to be restrictive of the scope of the invention.

EXAMPLE 1

A first solution of 8 parts by weight of a stereospecific polybutadiene rubber in 92 parts by weight of styrene monomer is prepared by agitating at 40° C. for 8 hours. The rubber used contains approximately 35% cis-1,4 structure, approximately 55% trans-1,4 structure, and approximately 12% vinyl 1,2 structure having a Mooney viscosity of the rubber (ML-4, 100° C.) at 55. To the above monomer composition is added 0.028% by weight tertiary butyl peroxy acetate. The above composition is fed continuously at approximately 125 pounds (56 kg.) per hour to a 100-gallon (379 lts.) anchor agitated reactor operated at approximately 35% fillage and at a temperature of 115° C. with a 5 psig nitrogen pressure. The agitator is rotated at a speed of 73 rpm. A partially polymerized first solution containing approximately 30% by weight solid matter (22% convertion) is withdrawn at a rate so as to maintain material holdup in the reactor essentially constant.

The 100 gallon reactor (379 lts.) has an agitator about 31 inches (155 cm) in diameter operating with about one inch (2.5 cm) clearance with the wall having the configuration shown in U.S. Pat. No. 3,903,202. Under the above described conditions, the agitative intensity as power input per unit volume of vessel holdup is about 5.5 watts per gallon (1.450 × 10$^7$ ergs per sec. per lts.), providing a partially polymerized first solution having rubber particles with a weight average particle size diameter of about 0.7 microns in the partially polymerized first solution.

EXAMPLE 2

Example 1 was repeated using a agitator speed of about 18 rpm corresponding to an agitative intensity as a power input per unit volume of about 0.20 watts per gallon (0.05 × 10$^7$ ergs. per sec. per lts.) a partially polymerized second solution having rubber particles with a weight average particle diameter of about 2.2 microns.

EXAMPLE 3

About 90 parts of said partially polymerized first solution effluent stream was continuously blended with about 10 parts of said partially polymerized second solution effluent stream in a flow through, back mixed stirred tank being agitated at an rpm of about 15 rpm to form a partially polymerized third solution effluent stream having said rubber phase dispersed as rubber particles having a bimodal particle size distribution wherein about 90% of the particles have a particle size diameter of about 0.7 microns and 10% of the particles have a particle size of about 2.2 microns.

EXAMPLE 4

Said partially polymerized third solution effluent stream was fed continously at about 139 lbs./hour (63 kg/hour) to a staged isobaric stirred reactor having a capacity at about 40% fillage. Said reactor having the configuration as disclosed in U.S. Pat. No. 3,903,202. The reactor is about 53 inches long. The agitator consists of a horizontal shaft on which are fixed a series of paddles about 2 inches wide alternating at right angles to one another. Along the shaft and rotating with it are four circular discs with an average radial wall clearance of about three-eighth inch rotating at 12 rpm. These discs are positioned to divide the reactor into five stages of approximately equal volume. The pressure in this reactor is maintained at approximately 20 psia.

The polymerized solution in the final stage is maintained at about 158° C. and contains about 62% polystyrene. Styrene vapor evaporated from the reactor is condensed and the condensate is returned to the first compartment. The polymerized solution is pumped continuously from the final state at a rate to maintain essentially constant fillage in the reactor and is delivered to the inlet of a devolatilizer preheater. The polymerized solution exists from the preheater at approximately 220° C. and enters a devolatilizer chamber maintained at 50 torr. Volatile vapors exiting the devolatilizer chamber are condensed and recycled to the first reactor preheater feed system. Approximately 3 lbs./hr. of the condensed devolatilized vapors are withdrawn as purge. The devolatilized melt is fed from the devolatilizer chamber to an extruder which forms it into a plurality of strands which are then cooled and cut into pellets. The polystyrene polymer produced has a Staudinger molecular of about 51,000 and a dispersion index about 3.1.

A polyblend having a matrix phase of polyvinylalkenyl aromatic polymer and a dispersed rubber phase was produced wherein the rubber phase has a bimodal particle size distribution with about 90% of the particles having a weight average particle size diameter of about 0.7 microns and about 10% having a particle size of about 2.2 microns.

EXAMPLES 5–13

Examples 1–4 disclose the steps used in producing continuously a polyblend having a bimodal rubber particle distribution. Example 1 was repeated over a range of agitation intensities to produce partially polymerized solutions having the rubber phase dispersed as different sized rubber particles as shown in Table I.

TABLE 1

| Example | RPM[1] | RPS[2] |
|---|---|---|
| 5 | 75 | 0.6 |
| 6 | 60 | 0.8 |
| 7 | 45 | 1.0 |
| 8 | 28 | 1.5 |
| 9 | 20 | 2.0 |
| 10 | 18 | 2.2 |
| 11 | 16 | 2.5 |
| 12 | 12 | 3.0 |
| 13 | 9 | 3.5 |

[1] RPM revolutions per minute
[2] RPS weight average diameter of rubber particles in microns.

EXAMPLES 14–24

Partially polymerized solutions were blended as in Example 3 and polymerized as in Example 4 to prepare various polyblends with differing bimodal particle size distributions and tested and shown in Table 2.

TABLE 2

| Example | Rubber Particle Sizes Blended (microns) | Percent Large | Gloss [1] | Izod Impact [2] Strength |
|---|---|---|---|---|
| 14 | 0.7 + 2.2 | 0 | 98.6 | 0.90 (4.9) [3] |
| 15 | 0.7 + 2.2 | 5 | 97.1 | 1.78 (9.7) |
| 16 | 0.7 + 2.2 | 10 | 95.0 | 1.80 (9.8) |
| 17 | 0.7 + 2.2 | 20 | 90.3 | 1.81 (9.86) |
| 18 | 0.7 + 2.2 | 30 | 87.0 | 1.83 (9.99) |
| 19 | 0.7 + 2.2 | 100 | 57.0 | 1.73 (9.39) |
| 20 | 1.0 + 2.2 | 0 | 91.0 | 1.20 (6.54) |
| 21 | 1.0 + 2.2 | 5 | 89.0 | 1.71 (9.33) |
| 22 | 1.0 + 2.2 | 10 | 87.3 | 1.80 (9.8) |
| 23 | 1.0 + 2.2 | 20 | 83.7 | 1.83 (9.99) |
| 24 | 1.0 + 2.2 | 30 | 82.1 | 1.94 (10.6) |

[1] Gloss - ASTM D-791-61T
[2] Izod Impact Strength - ASTM D-256-56 (½" × ½"bar ft.lbs./in. of notch)
[3] Izod Impact Strength in (kg.cm/cm.)

It is evident from the data that, high gloss was maintained at unexpectedly high levels in the polyblends having a bimodal particle size distribution yet the impact strength also was as high or higher than those polyblends having large particles only.

EXAMPLE 25

Step (C) Blending in a Third Reaction Zone

Ninety parts of the partially polymerized first solution of Example 1 and ten parts of the partially polymerized solution of Example 2 were fed continuously to the staged isobaric stirred reactor of Example 4 at a combined rate of 139 lbs./hours (63 kg/hour) forming a third partially polymerized solution under the agitation of the stirred reactor which was polymerized under the conditions of Example 4. The polyblend obtained from the process had a biomodal rubber particle size distribution wherein 90% of the particles had a particle size of 0.7 microns and 10% of the particles had a particle size of 2.2 microns. The polyblend had a gloss 94 and a impact strength of 1.79 ft.lbs./in. (9.75 kg.cm/cm).

What is claimed is:

1. A method for preparing monoalkenyl aromatic polyblends having a dispersed rubber phase as a rubber particle wherein said rubber particles have a bimodal size distribution comprising,
   A. continuously mass polymerizing a first solution of a monoalkenyl aromatic monomer having dissolved therein about 2 to 15% by weight of a diene rubber in a first reacton zone to a conversion of 10 to 50% forming a partially polymerized first solution with said rubber phase dispersed as rubber particles having an average diameter of about 0.5 to 1.0 microns,
   B. continuously mass polymerizing a second solution of a monoalkenyl aromatic monomer having dissolved therein about 2 to 15% by weight of a diene rubber in a second reaction zone to a conversion of about 10 to 50% forming a partially polymerized second solution with said rubber phase dispersed as rubber particles having an average diameter of about 2 to 3 microns,
   C. continuously mixing said first and second partially polymerized solutions to form a third partially polymerized solution having said rubber phase dispersed as rubber particles having a bimodal particle size distribution wherein about 70 to 95% of said particles have a particle size diameter of about 0.5 to 1.0 microns and 5 to 30% of said particles have a particle size diameter of about 2.0 to 3.0 microns,
   D. continuously mass polymerizing said third partially polymerized solution to a conversion of 60 to 90% in a third reaction zone,
   E. continuously heating an effluent from said third reaction zone to a temperature such that said rubber phase moiety becomes crosslinked as crosslinked rubber particles and,
   F. continuously separating a polyblend from said heated effluent, said polyblend having a polyalkenyl aromatic polymer as a matrix phase with a dispersed rubber phase as rubber particles with said bimodal rubber particle size distribution said polyblend having improved toughness and gloss.

2. A method of claim 1 wherein said polyblend has dispersed rubber particles, said particles being grafted with and having occluded said polyalkenyl aromatic polymer in an amount of about 0.5 to 5 parts per part of rubber.

3. A method of claim 1 wherein said rubber is a diene rubber selected from the group consisting of polybutadiene, polypentenomer, polychloroprene copolymers of butadiene-styrene, butadiene-acrylonitrile, chloroprene-styrene, chloroprene-acrylonitrile and mixtures thereof.

4. A method of claim 3 wherein said rubber is polybutadiene.

5. A method of claim 4 wherein said polybutadiene has a cis-isomer content of 30 to 98% and a Tg of about −50° C. to −105° C.

6. A method of claim 1 wherein said monoalkenyl aromatic monomer is selected from the group consisting of styrene, a-methylstyrene, chlorostyrene, dichlorostyrene, bromostyrene, and dibromostyrene and mixtures thereof.

7. A method of claim 1 wherein said monoalkenyl aromatic polymer has an average molecular weight of 40,000 to 70,000 Staudinger and a molecular weight dispersion index of 2.2 to 3.5.

8. A method of claim 1 wherein said rubber particles are crosslinked having a swelling index of about 7 to 30.

9. A method of claim 1 wherein step (A) is carried out at temperatures of about 110° to 140° C., with shearing agitation sufficient to size and disperse said diene rubber as rubber particles having an average diameter of about 0.5 to 1.0 microns.

10. A method of claim 9 wherein said shearing agitation is carried out at an agitator tip speed of about 675 to 1500 ft./min.

11. A method of claim 1 wherein step (B) is carried out at temperatures of 130° to 150° C., with shearing agitation sufficient to size and disperse said diene rubber as rubber particles having an average diameter of 2 to 3 microns.

12. A method of claim 11 wherein said shearing agitator is carried out with an agitator tip speed of about 200 to 300 ft./min.

13. A process of claim 1 wherein step (C) is carried out such that 70 to 95 parts of said first partially polymerized solution is mixed with about 5 to 30 parts of said second partially polymerized solution to form said third partially polymerized solution.

14. A process of claim 1 wherein step (D) is carried out by charging continuously said third partially polymerized solution to a first stage of a continuous staged isobaric stirred reaction zone having a plurality of stages so as to produce substantially linear flow through said stages downstream to a final stage, each of said stages operating at substantially constant gravimetric fillage of from about 15 to 90% of its volume of said polymerizing third partially polymerized solution, maintaining conditions in said continuous staged isobaric stirred reaction zone as said third reaction zone so as to polymerize said third partially polymerized solution by progressive multistage substantially linear flow polymerization, all said stages operating with shearing agitation and common evaporative vapor phase cooling under isobaric conditions in said third zone, providing each said stage with steady state polymerization at a controlled temperature of from 130° to 180° C. with a pressure of from about 7 to 28 psia and interfacial liquid contact stage to stage establishing a pressure gradient from the first stage downstream to the final stage causing substantially linear flow through said third zone, each said stage operating at a predetermined higher conversion level to a conversion of 60 to 95% in said final stage of said third reaction zone.

15. A process of claim 1 wherein step (E) is carried out by continuously heating the effluent from the third reaction zone to about 180° to 250° C. for a time sufficient to crosslink said rubber phase moiety to a swelling index of about 7 to 30.

16. A process of claim 1 wherein step (F) is carried out continuously in a devolatilizer operating below atmospheric pressure at a temperature of about 180° to 250° C. to provide said polyblend having a bimodal rubber particle size distribution wherein 70–95% of the rubber particles have a particle size of 0.5 to 1.0 microns and 5 to 30% of the rubber particles have a particle size of 2.0 to 3.0.

17. A process of claim 1 wherein the polymerization carried out in step (A) and step (B) is such that said first and second solutions have present about 0.001 to 3.0% by weight of a free radial generating catalyst based on said monomers.

18. A process of claim 17 wherein said free radical catalyst is selected from the group consisting of di-tert-butyl peroxide, tert-butyl peracetate, benzoyl peroxide, lauroyl peroxide, tert-butyl perbenzoate, dicumyl peroxide, tert-butyl peroxide and isopropyl carbonate or mixtures thereof.

19. A process of claim 1 wherein step (C) is carried out under agitation in said third reaction zone to form said third partially polymerized third solution simultaneously with said mass polymerization of step (D) in said third reaction zone.

20. A method for preparing monoalkenyl aromatic polyblends having a dispersed rubber phase as a rubber particle wherein said rubber particles have a bimodal size distribution comprising,
   A. continuously mass polymerizing a first solution of a styrene monomer having dissolved therein about 2 to 15% by weight of a polybutadiene rubber in a first reaction zone to a conversion of 10 to 50% forming a partially polymerized first solution with said rubber phase dispersed as rubber particles having an average diameter of about 0.5 to 1.0 microns,
   B. continuously mass polymerizing a second solution of a styrene monomer having dissolved therein about 2 to 15% by weight of a polybutadiene rubber in a second reaction zone to a conversion of about 10 to 50% forming a partially polymerized second solution with said rubber phase dispersed as rubber particles having an average diameter of about 2 to 3 microns,
   C. continuously mixing said first and second partially polymerized solutions to form a third partially polymerized solution having said rubber phase dispersed as rubber particles having a bimodal particle size distribution wherein about 70 to 95% of said particles have a particle size diameter of about 0.5 to 1.0 microns and 5 to 30% of said particles have a particle size diameter of about 2.0 to 3.0 microns,
   D. continuously mass polymerizing said third partially polymerized solution to a conversion of 60 to 90% in a third reaction zone,
   E. continuously heating an effluent from said third reaction zone to a temperature such that said rubber phase moiety becomes crosslinked as crosslinked rubber particles, and
   F. continuously separating a polyblend from said heated effluent, said polyblend having a polystyrene polymer as a matrix phase with a dispersed polybutadiene rubber phase as rubber particles with said bimodal rubber particle size distribution said polyblend having improved toughness and gloss.

21. A method for preparing monoalkenyl aromatic polyblends having a dispersed rubber phase as a rubber particle wherein said rubber particles have a bimodal size distribution comprising,
   A. continuously mass polymerizing a first solution of a styrene monomer having dissolved therein about 2 to 15% by weight of a polybutadiene rubber in a first reaction zone to a converion of 10 to 50% forming a partially polymerized first solution with said rubber phase dispersed as rubber particles having an average diameter of about 0.5 to 1.0 microns, B. continuously mass polymerizing a second solution of a styrene monomer having dissolved therein about 2 to 15% by weight of a polybutadiene rubber in a second reaction zone to a conversion of about 10 to 50% forming a partially polymerized second solution with said rubber phase dispersed as rubber particles having an average diameter of about 2 to 3 microns, C. continuously mixing said first and second partially polymerized solutions to form a third partially polymerized solution having said rubber phase dispersed as rubber particles having a bimodal particle size distribution wherein about 70 to 95% of said particles have a particle size diameter of about 0.5 to 1.0 microns and 5 to 30% of said particles have a particle size diameter of about 2.0 to 3.0 microns, D. continuously mass polymerizing said third partially polymerized solution to a conversion of 50 to 90% in a third reaction zone, E. continuously heating an effluent from said third reaction zone to a temperature such that said rubber phase moiety becomes crosslinked as crosslinked rubber particles, and F. continuously separating a polyblend from said heated effluent, said polyblend having a polystyrene polymer as a matrix phase with a dispersed polybutadiene rubber phase as rubber particles with said bimodal rubber particle size distribution said polyblend having improved toughness and gloss, said rubber particles being grafted with and having occluded said polystyrene polymer in an amount of about 0.5 to 5 parts per part of rubber, said rubber particles having a swelling index of about 7 to 30.

* * * * *